US007979350B1

(12) United States Patent
Carion

(10) Patent No.: US 7,979,350 B1
(45) Date of Patent: Jul. 12, 2011

(54) METHOD AND SYSTEM FOR ACCESSING WIRELESS ACCOUNT INFORMATION

(75) Inventor: Pierre Carion, La Jolla, CA (US)

(73) Assignee: GoTV Networks, Inc., Sherman Oaks, CA (US)

( * ) Notice: Subject to any disclaimer, the term of this patent is extended or adjusted under 35 U.S.C. 154(b) by 0 days.

(21) Appl. No.: 11/977,186

(22) Filed: Oct. 23, 2007

(51) Int. Cl.
*G06Q 40/00* (2006.01)
(52) U.S. Cl. ........................................................ 705/40
(58) Field of Classification Search .................. 705/40; 455/406–409, 414.1–414.2
See application file for complete search history.

(56) References Cited

U.S. PATENT DOCUMENTS

| 5,060,140 | A | 10/1991 | Brown et al. | |
|---|---|---|---|---|
| 6,345,279 | B1 | 2/2002 | Li et al. | |
| 6,795,710 | B1 | 9/2004 | Creemer | |
| 6,884,172 | B1 | 4/2005 | Lloyd et al. | |
| 6,996,537 | B2 * | 2/2006 | Minear et al. | 705/26 |
| 7,222,154 | B2 * | 5/2007 | Dowling | 709/203 |
| 7,286,562 | B1 | 10/2007 | Vargo et al. | |
| 7,506,070 | B2 | 3/2009 | Tran et al. | |
| 7,580,703 | B1 | 8/2009 | Veselov et al. | |
| 7,599,665 | B2 | 10/2009 | Sinivaara | |
| 7,636,792 | B1 | 12/2009 | Ho | |
| 2002/0018487 | A1 | 2/2002 | Chen et al. | |
| 2002/0103881 | A1 | 8/2002 | Granade et al. | |
| 2002/0109718 | A1 | 8/2002 | Mansour et al. | |
| 2002/0131404 | A1 | 9/2002 | Mehta et al. | |
| 2003/0018521 | A1 | 1/2003 | Kraft et al. | |
| 2003/0106022 | A1 | 6/2003 | Goodacre et al. | |
| 2003/0120637 | A1 | 6/2003 | Chithambaram et al. | |
| 2003/0182419 | A1 | 9/2003 | Barr et al. | |
| 2004/0210907 | A1 | 10/2004 | Lau et al. | |
| 2004/0236860 | A1 | 11/2004 | Logston et al. | |
| 2004/0252197 | A1 | 12/2004 | Fraley et al. | |
| 2005/0223352 | A1 | 10/2005 | Nishida | |
| 2006/0031387 | A1 * | 2/2006 | Hamzeh et al. | 709/217 |
| 2006/0236308 | A1 | 10/2006 | Lamb et al. | |
| 2007/0067373 | A1 | 3/2007 | Higgins et al. | |
| 2007/0078009 | A1 | 4/2007 | Lockton et al. | |
| 2007/0123229 | A1 * | 5/2007 | Pousti | 455/414.1 |
| 2007/0130156 | A1 | 6/2007 | Tenhunen et al. | |
| 2007/0130333 | A1 | 6/2007 | Bhalla et al. | |

(Continued)

FOREIGN PATENT DOCUMENTS

EP 1571547 7/2005

(Continued)

OTHER PUBLICATIONS

Grundy, John et al.: "An Architecture for Building Multi-device Thin-Client Web User Interfaces" Advanced Information Systems Engineering, vol. 2348/2002, Jan. 1, 2002, pp. 728-732, XP002511217.

(Continued)

*Primary Examiner* — Hani Kazimi
*Assistant Examiner* — Clifford Madamba

(57) ABSTRACT

A method for managing wireless account information. A list of applications is presented via a web interface on a computing device. The applications are operable to run on a wireless handheld device and a plurality of billing options are presented. In response to receiving a selection of an application, a wireless account is updated via a link between a web account and a wireless account according to the selected application, such that the selected application is available when a wireless account is accessed via a wireless handheld device.

13 Claims, 5 Drawing Sheets

U.S. PATENT DOCUMENTS

| | | | |
|---|---|---|---|
| 2008/0016176 | A1 | 1/2008 | Leitner |
| 2009/0037329 | A1 | 2/2009 | Coppinger et al. |
| 2009/0037391 | A1 | 2/2009 | Agrawal et al. |
| 2009/0177663 | A1 | 7/2009 | Hulaj et al. |
| 2009/0220068 | A1 | 9/2009 | Vialle et al. |
| 2009/0227274 | A1 | 9/2009 | Adler et al. |
| 2009/0259940 | A1 | 10/2009 | Moraes |

FOREIGN PATENT DOCUMENTS

| | | |
|---|---|---|
| KR | 1020070003418 | 5/2007 |
| KR | 1020080022697 | 12/2008 |
| WO | WO02103963 | 12/2002 |

OTHER PUBLICATIONS

Mir Farooz Ali et al.; "Building Multi-Platform User Interfaces with UIML" Internet Citation, [online] XP002280476 Retrieved from the internet: URL: http://arxiv.org/ftp/cs/papers/0111/0111024.pdf> [Retrieved on May 17, 20004].

Simon, Rainer et al: "Tool-Supported Single Authority for Device Independence and Multimodality" Proceedings of the 7th International Conference on Human Computer Interaction with Mobile Devices & Services, [Online] Sep. 19, 2005, Sep. 22, 2005 pp. 91-98, XP002511216 Retrieved from the internet: URL: http//portal.acm.org/citation.cfm?id=1085777.1085793> [Retrieved on Jan. 19, 2009] abstract.

Thomas Ziegert et al: "Device Independent Web Applications-The Author Once-Display Everywhere Approach" Web Engineering [Lecture Notes in Computer Science, LNCS], Springer-Verlag, Berline/Heidelberg. vol. 3140, Jul. 7, 2004, pp. 244-255, XP019009054.

VanderDonckt, Jean et al: Synchronised Model-Based Design of Multiple User Interfaces Internet Article, [Online] Sep. 10, 2004, pp. 1-8, XP002511218 Retrieved from the Internet: URL: http://web.archive.org/web/20040910043454/http://www.isys.uchi.ca.be/cbh/members/qli/put/Vanderdonckt-IHM2001.pdf>[retrieved on Jan. 20, 2009].

Office Action mailed Aug. 19, 2010 for U.S. Appl. No. 11/977,319, filed Oct. 23, 2007.

Office Action mailed Jul. 30, 2010 for U.S. Appl. No. 11/977,229, filed Oct. 23, 2007.

Office Action mailed Sep. 17, 2009 for U.S. Appl. No. 11/977,212, filed Oct. 23, 2007.

Final Office Action mailed Jun. 29, 2010 for U.S. Appl. No. 12/098,670, filed Apr. 7, 2008.

Office Action mailed Jun. 25, 2010 for U.S. Appl. No. 11/888,799, filed Aug. 1, 2007.

Office Action mailed Jun. 21, 2010 for U.S. Appl. No. 11/977,212, filed Oct. 23, 2007.

Office Action mailed Jan. 7, 2010 for U.S. Appl. No. 12/098,670, filed Apr. 7, 2008.

International Search Report and Written Opinion mailed Oct. 6, 2009 for International PCT Application No. PCT/US2009/001514, 6 pgs.

International Search Report and Written Opinion mailed Oct. 6, 2009 for International PCT Application No. PCT/US2009/001516, 10 pgs.

Written Opinion mailed Feb. 1, 2010 for International PCT Application No. PCT/US2008/009303, 8 pgs.

Written Opinion mailed Feb. 1, 2010 for International PCT Application No. PCT/US2008/009302, 8 pgs.

* cited by examiner

400

```
┌─────────────────────────────────────┐
│   Establishing A Secure Connection  │
│                402                  │
└─────────────────────────────────────┘
                  ↓
┌─────────────────────────────────────┐
│        Presenting An Interface      │
│                404                  │
└─────────────────────────────────────┘
                  ↓
┌─────────────────────────────────────┐
│    Presenting A List Of Applications│
│                406                  │
└─────────────────────────────────────┘
                  ↓
┌─────────────────────────────────────┐
│ Presenting Information Related To An Application │
│                408                  │
└─────────────────────────────────────┘
                  ↓
┌─────────────────────────────────────┐
│ Presenting An Interactive Version Of An Application │
│                410                  │
└─────────────────────────────────────┘
                  ↓
┌─────────────────────────────────────┐
│   Receiving A Selection Of An Application │
│                412                  │
└─────────────────────────────────────┘
                  ↓
┌─────────────────────────────────────┐
│  Presenting A Plurality Of Billing Options │
│                414                  │
└─────────────────────────────────────┘
                  ↓
┌─────────────────────────────────────┐
│ Receiving A Request To Purchase The Selected Application │
│                416                  │
└─────────────────────────────────────┘
                  ↓
┌─────────────────────────────────────┐
│         Setting An Expiration       │
│                418                  │
└─────────────────────────────────────┘
                  ↓
┌─────────────────────────────────────┐
│ Presenting Application Customization Options │
│                420                  │
└─────────────────────────────────────┘
                  ↓
┌─────────────────────────────────────┐
│       Updating The Wireless Account │
│                422                  │
└─────────────────────────────────────┘
```

FIGURE 4

METHOD AND SYSTEM FOR ACCESSING WIRELESS ACCOUNT INFORMATION

TECHNICAL FIELD

Embodiments of the present invention relate to the field of wireless communication systems. More particularly, embodiments of the present invention relate to a method and system for accessing wireless account information.

BACKGROUND ART

The widespread increase in the number of wireless devices has increased the demand and the corresponding opportunity for businesses to provide applications, content, and services for various wireless devices.

The limited abilities of wireless devices further complicate otherwise simple tasks. Unfortunately, most wireless devices are plagued by small screens and small or limited keypads which make it cumbersome and difficult to type information. Users often identify themselves to a resource via a username and password, however on a wireless device the entry of a username and password can be a lengthy process. Further, purchases, such as software or applications, are likewise complicated by the limited interfaces of wireless devices. For example, if a user wishes to purchase an application, it can quickly become time consuming and frustrating for a user to enter billing information such as a credit card and billing address via a 10 digit keypad of most cellular phones. Moreover, some wireless devices lack the resources necessary to create secure connections needed for safe and secure purchases.

Businesses further require an efficient and effective way to bill customers for the services or products provided. Often times, each wireless carrier has a proprietary billing platform which requires developers to tailor the software billing system to each carrier. Any changes to the carriers billing system may necessitate substantial changes by developers and thus more work for developers. Furthermore, the various billing platforms may have different abilities with regard to frequency of billing and other billing attributes. For example, a billing platform may not support recurring billing. Such a lack of support may run counter to a software vendor's business model. Thus, efficient and effective selling of wireless applications requires that both user and software developers be able to purchase and charge customers accordingly.

Thus, a need exists for a solution that facilitates the easy purchase of services and software for wireless devices and allows flexibility in the type of billing. What is further needed is an interface for users to easily and efficiently initiate purchases of products and services for the wireless devices without being required to use the limited interfaces of wireless devices.

SUMMARY

Accordingly, a need has arisen to enable software vendors to provide a convenient way for users to purchase applications, services, and content and thereby allowing users to purchase applications without having to use the limited interfaces of the wireless device. Moreover, a need has arisen to have flexibility in billing users and relieve software vendors of tailoring billing systems to each carrier or service provider. It will become apparent to those skilled in the art after reading the detailed description of the present invention that the embodiments of the present invention satisfy the above mentioned needs.

According to one embodiment, the present invention is implemented as a method for managing wireless account information. The method includes presenting, via a web interface on a computing device, a list of applications which are operable to run on a wireless handheld device. A selection of an application is then received from the computing device and a plurality of billing options may then be presented. In response to receiving the application selection and billing option selection, a wireless account is updated via a link between a web account and a wireless account such that the selected application is available when the wireless account is accessed via a wireless handheld device.

In another embodiment of the present invention, the present invention is implemented as a method for account management. The method includes receiving a first message to create an account. In response to the first message, a second message is sent to a wireless device including an identifier. Upon receiving a third message including the identifier a web account is created. A link may then be established between the web account and a wireless applications account.

In another embodiment, the present invention is implemented as system for accessing information for wireless applications. The system includes an account management component for managing web accounts and the associated authentication information. The web accounts are created and associated with a corresponding wireless device account by an account setup component. The wireless device account information may be accessed through a wireless device account interface component. The system further includes a billing component for managing billing and thereby purchasing of applications.

In this manner, embodiments of the present invention relieve users of having to use the limited interfaces of wireless devices to purchase applications, services and content because a web interface allows use of a computer to conduct the transactions in ways familiar to users. Moreover, embodiments of the present invention allow billing to be conducted independent of the carrier's billing platform and thus, in a flexible manner. Thus, software vendors and developers are relieved of having to tailor billing systems to each carriers billing platform.

BRIEF DESCRIPTION OF THE DRAWINGS

FIG. 4 shows an exemplary computer controlled flow diagram for managing wireless account information in accordance with one embodiment of the present invention.

DETAILED DESCRIPTION

Figure 1:
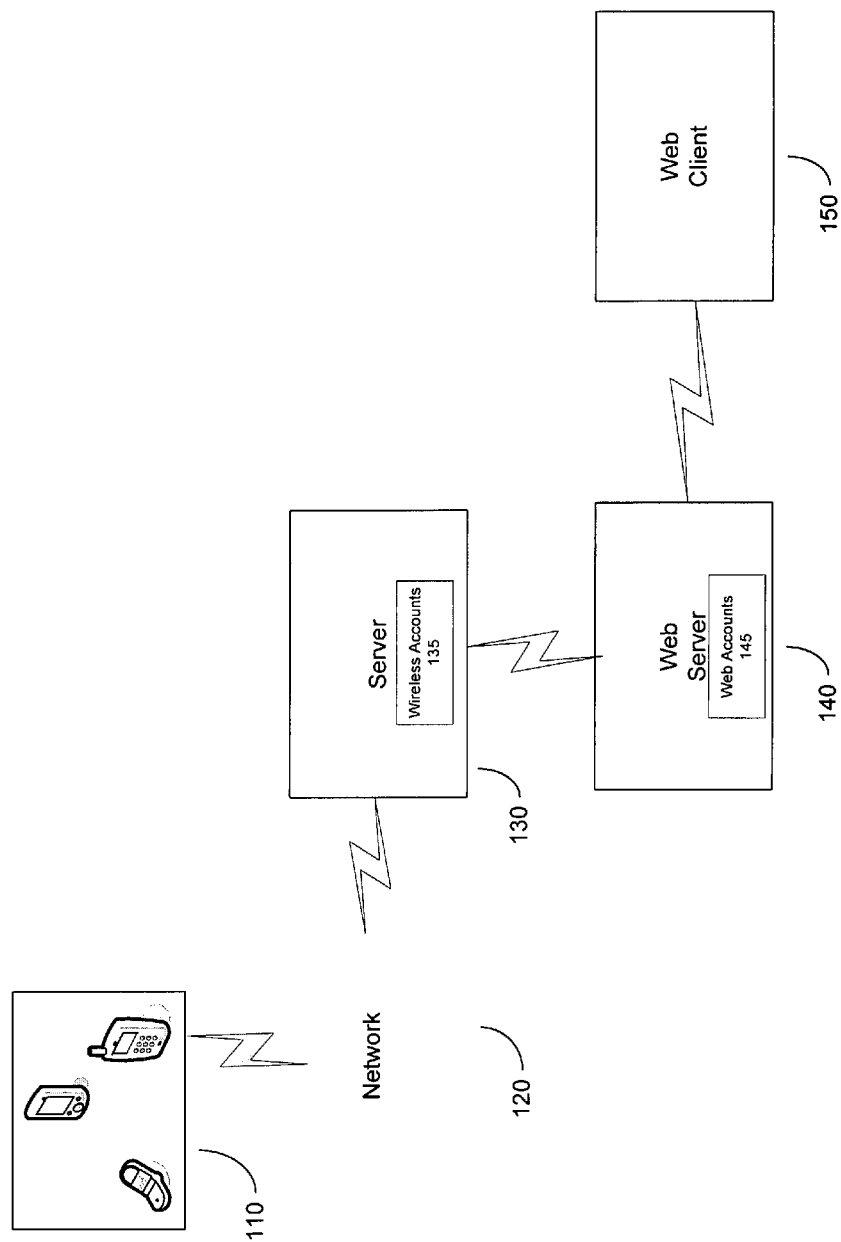
FIG. 1 shows an exemplary communication system in accordance with one embodiment of the present invention including wireless clients, a remote server, and a web client.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "initiating" or "receiving" or "analyzing" or "generating" or "constructing" or "outputting" or "collecting" or "monitoring" or "outputting" or "storing" or "sending" or "receiving" or "identifying" or "using" or "rendering" or "translating" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The increase in the number of wireless devices has led to a demand for efficient and easy way to sell users wireless applications, content, and services. However, conventionally billing methods require software billing systems to be tailored to the wireless carrier or service provider's billing platform. Embodiments of the present invention relieve software vendors from tailoring their billing systems to each specific carrier and allow software vendors to provide an easy way for users to purchase applications, content, and services for their wireless devices. Moreover, embodiments of the present invention provide centralized location for managing and purchasing of applications for wireless devices. Thus, users are able to purchase and access applications without having to use the limited interfaces of wireless devices.

FIG. 1 shows an exemplary communication system in accordance with one embodiment of the present invention including wireless clients, a remote server, and a web client. It is appreciated that the remote server and web server may execute on the same physical computing system. In one embodiment, one or more wireless devices 110 are coupled to a server 130 through a network 120. The wireless devices 110 may be any mobile wireless electronic device, e.g., a cellular phone, a personal digital assistant (PDA), a pager, a smart phone, a BlackBerry, a laptop and the like. It is appreciated that the wireless device described herein is exemplary and is not intended to limit the scope of the present invention. Network 120 includes wireless communication capability.

According to an embodiment of the present invention, the remote server 130 hosts wireless accounts 135 which may be a plurality of wireless: applications, content, and/or service accounts. The accounts may include information such as the type(s) of wireless device(s), billing information (e.g., payment plan, payment method, expiration date), and applications associated with the account. Remote server 130 may run generic applications which are then customized for display on wireless devices 110.

In one embodiment, web server 140 executes a web server application which allows web server 140 to communicate with various web clients (e.g., web client 150) running web browsers and the like. Web client 150 may be any computing system (e.g., desktop, laptop, or the like) capable of running or executing a web client such as a web browser for communicating with web server 140.

According to one embodiment of the present invention, web server 140 provides an interface for web clients to create and access web accounts 145 and further provides a link between web accounts 145 and wireless accounts 135. This link allows user to change and access properties of a wireless account via a web client. Advantageously, the ability to make changes to a wireless account allows the selection and purchase of applications and corresponding billing information to be entered quickly and conveniently via the web client (e.g., desktop or laptop) as opposed to via the wireless devices 110. For example, entering a billing address and credit card number via a wireless device can be quite time consuming. Thus, embodiments of the present invention harness the power of the internet to allow users to quickly and efficiently manage their wireless applications/content accounts.

System 100 further allows a consumer's applications account (e.g., wireless accounts 135) to be independent of a carrier or service provider. For example, if a user changes wireless carriers, the new wireless device may be added to the current wireless applications account (e.g., wireless accounts 135) and thereby allow the user to keep using the purchased wireless applications and any associated customizations without requiring changes or interruption to application access. In another embodiment, system 100 may further be integrated with a service provider's (e.g., wireless carrier) website. For example, a wireless carrier may include system 100 within the carrier's website to sell applications to users.

Figure 2:
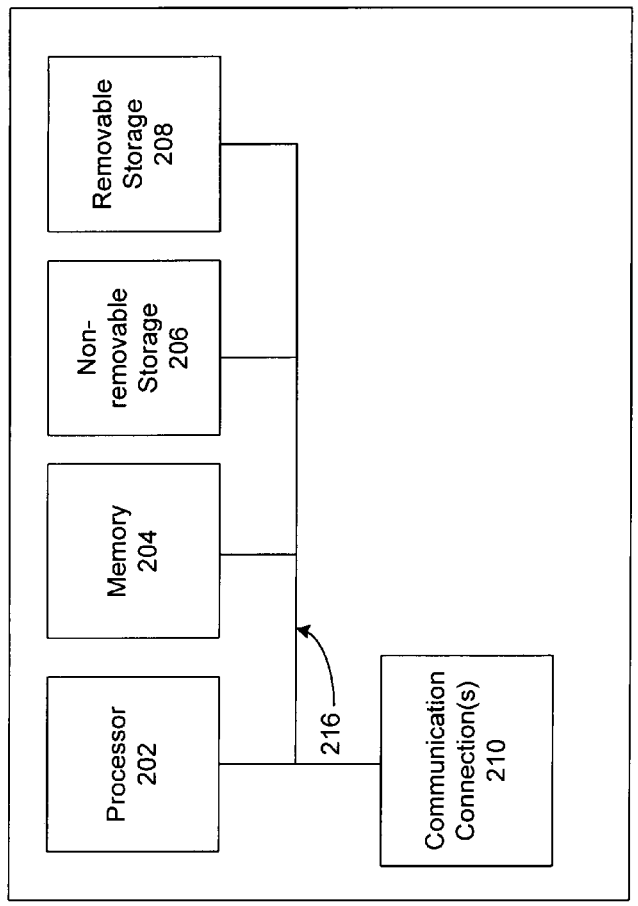
FIG. 2 shows an exemplary device block diagram in accordance with one embodiment of the present invention.
Figure 5:
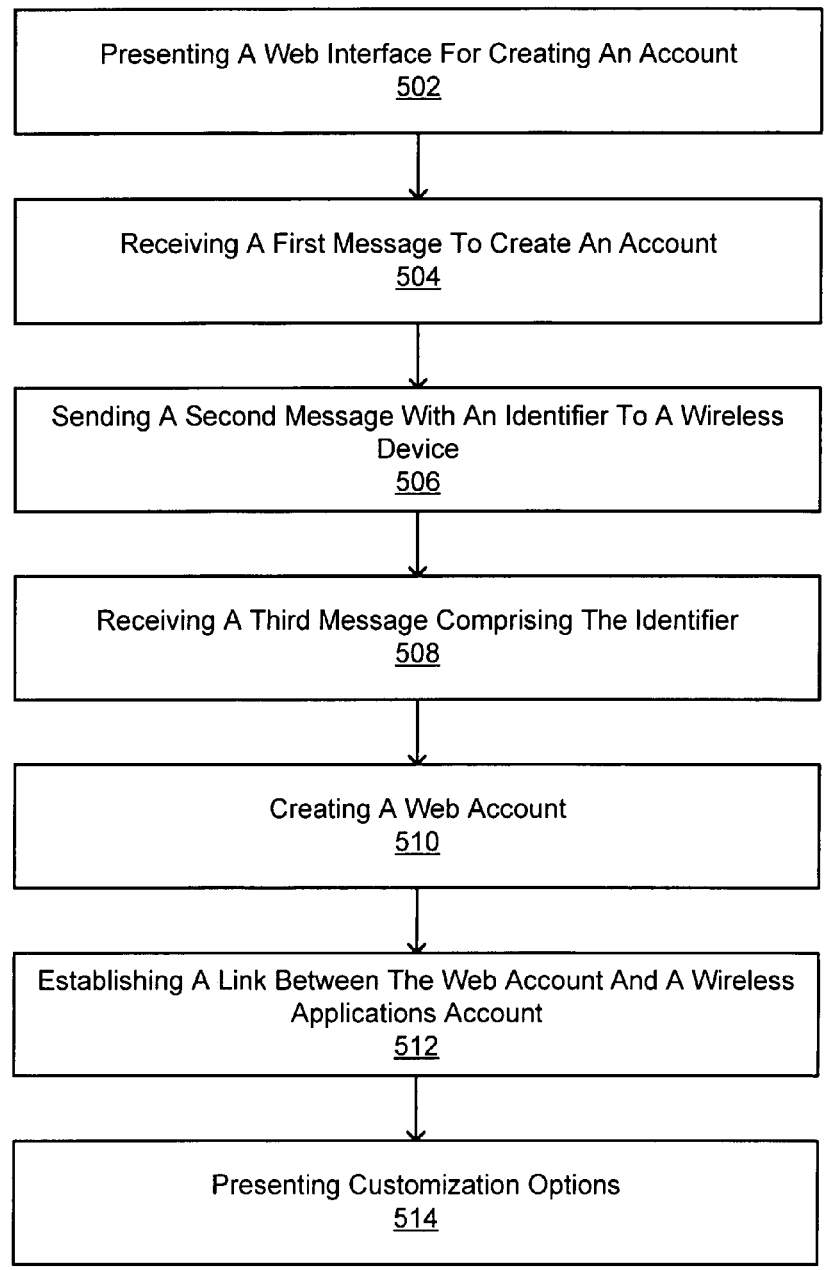
FIG. 5 shows an exemplary computer controlled flow diagram of a server implemented method of account management in accordance with one embodiment of the present invention.

FIG. 2 shows an exemplary device block diagram in accordance with one embodiment of the present invention. Computing system environment 200 may implement the process for establishing and linking web accounts and wireless accounts as shown in FIGS. 5 and 6 and includes a bus 216 or other communication mechanism for communicating information, and a processor 202 coupled with bus 216 for processing information.

With reference to FIG. 2, an exemplary system for implementing embodiments includes a general purpose computing system environment, such as computing system environment 200. Computing system environment 200 may include, but is not limited to, servers. In its most basic configuration, computing system environment 200 typically includes at least one processing unit 202 and memory 204. Depending on the exact configuration and type of computing system environment, memory 204 may be volatile (such as RAM), non-volatile (such as ROM, flash memory, etc.) or some combination of the two. System memory 204 may include, among other things, a web server application. Computing system environment 200 may further include additional storage media as illustrated in FIG. 2 by non-removable storage 206 and removable storage 208. Computer storage media includes volatile and nonvolatile, removable and non-removable media implemented in any method or technology for storage of information such as computer readable instructions, data structures, program modules or other data.

Computing system environment 200 may also contain communications connection(s) 210 that allow it to communicate with other devices. Communications connection(s) 210 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 210 may allow computing system environment 200 to communication over various networks types including, but not limited to, Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 210 connect to may run a plurality of network protocols including, but not limited to, transmission control protocol (TCP), internet protocol (IP), and hypertext transfer protocol (HTTP).

The term "computer-readable medium" as used herein refers to any medium that participates in providing instructions to processor 202 for execution. Such a medium may take many forms, including but not limited to, non-volatile media, volatile media, and transmission media. Non-volatile media includes, for example, optical or magnetic disks or the like. Volatile media includes dynamic memory and the like.

The claimed subject matter is described in terms of these example environments. Description in these terms is provided for convenience only. It is not intended that the invention be limited to application in this example environment. In fact, after reading the following description, it will become apparent to a person skilled in the relevant art how to implement the claimed subject matter in alternative embodiments.

Figure 3:
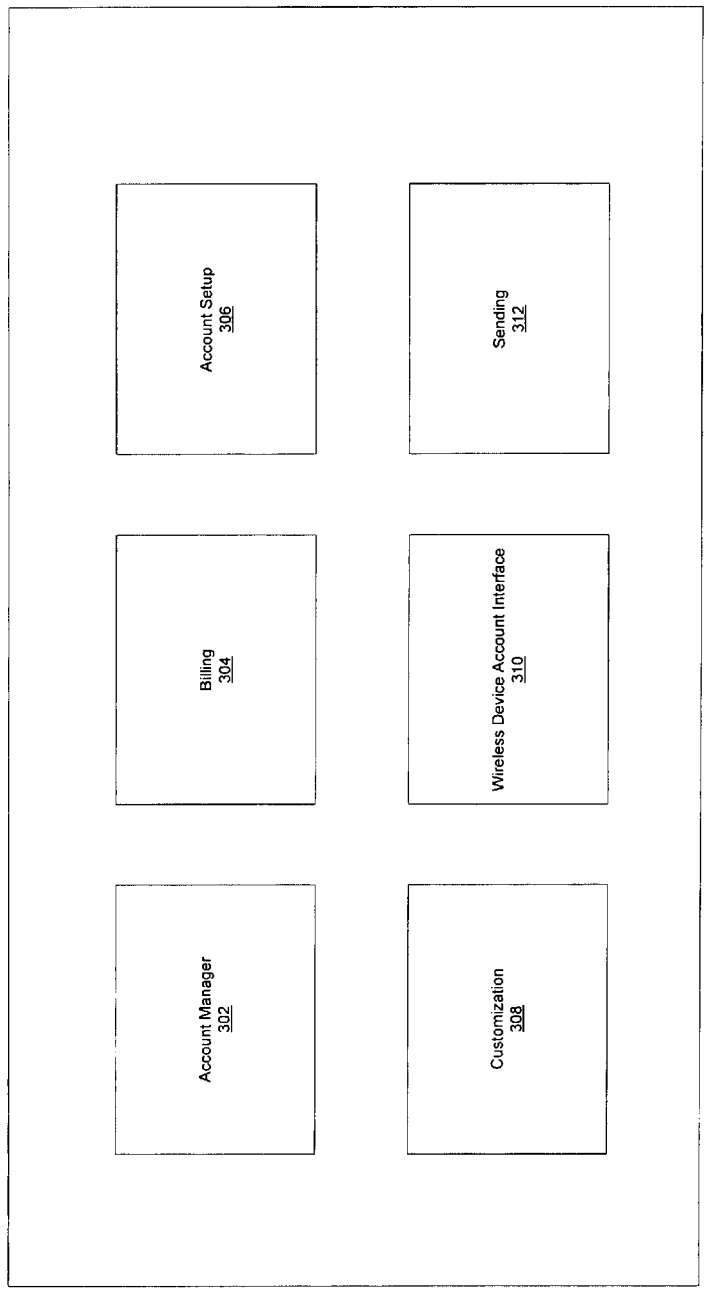
FIG. 3 shows an exemplary web server block diagram in accordance with one embodiment of the present invention.

FIG. 3 illustrates example components used by various embodiments of the present technology for managing accounts. System 300 includes components or modules that, in various embodiments, are carried out by a processor under the control of computer-readable and computer-executable instructions. The computer-readable and computer-executable instructions reside, for example, in data storage features such as computer memory 204, removable storage 208, and/or non-removable storage 206 of FIG. 2. The computer-readable and computer-executable instructions are used to control or operate in conjunction with, for example, processing unit 202 of FIG. 2. It should be appreciated that the aforementioned components of system 300 can be implemented in hardware or software or in a combination of both. Although specific components are disclosed in system 300 such components are examples. That is, embodiments are well suited to having various other components or variations of the components recited in system 300. It is appreciated that the components in system 300 may operate with other components than those presented, and that not all of the components of system 300 may be required to achieve the goals of system 300.

FIG. 3 shows an exemplary web server block diagram in accordance with one embodiment of the present invention. System 300 may implement a process for accessing information related to wireless applications. In one embodiment, modules or components of system 300 may be executed by a web server (e.g., web server 140). It is appreciated that system 300 may be executed on a system independent of a carrier or service provider. System 300 may also be integrated into the offerings of a wireless service provider. Thus, system 300 may allow carrier independent purchasing and wireless application accounts so that a user may access his or her wireless applications via different phones and service providers. System 300 includes account manager 302, billing component 304, account setup 306, customization component 308, wireless device account interface 310, and sending component 312.

Account manager 302 facilitates management of web accounts and the associated authentication information. Account manager 302 presents an authentication interface (e.g., username and password prompt or page) for access to web accounts. Account manager 302 may act similar to a portal in providing a plurality of options such as a section for purchasing applications, services, and content as well as managing account information such as billing and authentication information. Account manager 302 may further allow users to apply customizations to the web interface such as skins or custom graphical user interface objects (e.g., icons and colors) and layouts.

Billing Component 304 manages billing and purchasing of applications. Billing component 304 may complete payment collection from a user or subscriber. For example, the billing component may carry out the charging of a customer's credit or debit card. It is appreciated that billing component 304 may accept payment in the various forms that various Internet e-commerce sites allow. In another embodiment, billing component 304 may also support charging a user's service provider account where possible.

Additionally, billing component 304 allows the purchase of wireless applications and/or associated content via a wide variety of billing options. For example, purchase options may include a number of use trial (e.g., use only three times), one day trial, one month, several month subscription, or recurring subscription.

Billing component 304 may further determine the expiration time and/or date of an application purchase in the wireless account. Upon attempting to access an expired application, the wireless device may display a message informing the user that the current application is expired and he/she may update their subscription/access to the application via a web interface as describe herein. It is appreciated that the wireless device may allow the user to purchase renewed or continued access via the wireless device.

Account setup component 306 facilitates creating a web account and wireless accounts and associating the web accounts with a corresponding wireless device account. Account setup component 306 may perform a process (e.g., process 500) as described herein for creating a web account and verifying or confirming communication with the wireless device (e.g., sending a message with an identifier or identification information).

Account setup component 306 may also receive and store login information for use later by account manager 302. Account setup component 306 may further store information with a web client to allow quick return access upon the revisiting of a user. For example, upon creation of an account, account setup component 306 may facilitate the creation of a cookie on a web client which can be later used to verify the client was previously authenticated.

In addition, account setup component 306 may present various advertisements including advertisements for wireless applications, services, and associated content. It is appreciated that such advertising is well suited for presentation via a web interface.

Customization component 308 allows for customizing information related to the wireless device account. Customization 308 may allow selection of one or more application objects (e.g., RSS feeds, location information, information components or modules such as a sports module, user information, etc.) and visual objects (e.g., icons, skins, and the like) to be added to an application. For example, a user may be able to select several RSS (Really Simple Syndication) feeds for viewing in a news application on a cellular telephone. It is appreciated that selecting and otherwise entering RSS feed information (e.g., URLs) could be cumbersome and time consuming to enter via a wireless device (e.g., cellular telephone).

Similarly, customization component 308 may facilitate the selection of bookmarks, contact or buddy lists, sports teams, and email login information. Thus, customization component 308 allows a user to quickly and easy add information via the powerful web interface of a web client and avoid the complications of doing so via a wireless device. It is appreciated that some or all functions available via customization component 308 may be accessed via a wireless device (e.g., cellular telephone).

Wireless device account interface 310 facilitates access to wireless device account information. Wireless device account interface 310 may further facilitate the modification of wireless device accounts stored on a remote server (e.g., server 130) or accounts stored locally on a server. It is appreciated that wireless device account interface 310 may update wireless device accounts in a plurality of ways including, but not limited to, application programming interfaces (APIs) or database access. More specifically, wireless account interface 310 may update the wireless account immediately after an application has been purchased.

Wireless device account interface 310 may further allow communication between wireless users and internet users. For example, a chat application may be purchased which allows the wireless device users to communicate with computer users. As described herein, customization component 308 may allow a user to create, add, and modify a list of buddies to be presented in the chat application.

Sending component 312 facilitates sending of a purchased application, service, or content to a different wireless account. In one embodiment, sending component 312 facilitates the delivery of an application as a gift for a user. For example, a user may purchase an application as a birthday gift for a friend (e.g., identified by the friend's phone number) and the friend will receive a notification message that an application has been purchased and may be accessed by going to wireless applications browser, list, or client. If the user does not currently have a wireless applications account, sending component 312 may send an SMS message with a link to download the client for accessing wireless applications.

In another embodiment, sending component 312 may also push a purchased application to a phone. The wireless device may request a list of applications upon startup and receive (e.g., via a push) information related to the new applications. For example, a newly purchased software application may require a skin or set of images to be pushed to the wireless device for quick viewing in the future.

Different blocks have been described as separate units. However, it is appreciated that each functional unit described herein may be integrated as a single working unit. As such, depiction of functional units as separate units is exemplary and should not be construed as limiting the scope of the present invention.

The following discussion sets forth in detail the operations of the present technology for account management. With reference to FIGS. 4 and 5, flowcharts 400 and 500 each illustrate example blocks used by various embodiments of the present technology. Flowcharts 400 and 500, include processes that, in various embodiments, are carried out by a processor under the control of computer-readable and computer-executable instructions. The computer-readable and computer-executable instructions reside, for example, in data storage features such as computer memory 204, removable storage 208, and/or non-removable storage 206 of FIG. 2. The computer-readable and computer-executable instructions are used to control or operate in conjunction with, for example, processing unit 202 of FIG. 2. Although specific blocks are disclosed in flowcharts 400 and 500, such blocks are examples. That is, embodiments are well suited to performing various other blocks or variations of the blocks recited in flowcharts 400 and 500. It is appreciated that the blocks in flowcharts 400 and 500 may be performed in an order different than presented, and that not all of the blocks in flowcharts 400 and 500 may be performed.

FIG. 4 shows an exemplary computer controlled flow diagram 400 for managing wireless account information in accordance with one embodiment of the present invention. The blocks of flowchart 400 may be carried out by a computing system (e.g., computing system environment 200) acting as a web server (e.g., web server 140) via software based units (e.g., system 300). It is appreciated that the blocks of flowchart 400 may be carried out by a computing system that also hosts or stores various wireless device accounts as described herein.

At block 402, a secure connection is established. In one embodiment, the secure connection (e.g., via secure sockets layer (SSL) or the like) is established between a client (e.g., web client 150) and a computing system such as a server (e.g., web server 140). It is noted that the client may be a computing system that executes a web browser. The secure connection allows the communication of login and billing information which might otherwise be insecure if communicated via a wireless device.

At block 404, an account interface is presented. In one embodiment, the account interface may be presented via a software based unit (e.g., account manager 302). The account interface may be a web interface including a plurality of static and dynamic pages presented to a user via a web browser or may be presented to a user via a specialized or customized application for running natively on a computer operating system. The account interface allows a user to authenticate themselves (e.g., via login name and password). Users may further be able to store pertinent information including, but not limited to, contact information, billing information, phone model, and service provider. It is noted that a user may repeatedly access the account interface to update information and change application related options, such as, customizations. The interface may further allow the user to create web and associated wireless accounts as well as managing wireless applications including remove applications from his/her wireless account.

At block 406, a list of applications is presented. The account interface described herein, may allow a user to browse and find applications, services, and content in a variety of ways, including, but not limited to, searching, categories, and lists such as most popular. A list of the applications that a user currently has associated with his/her wireless account may also be presented.

At block 408, information related to an application is presented. The list of applications may contain descriptions, pictures, sounds, and video associated with an application. For example, a description and animated image showing various screens of an application may be presented. The information may also contain cost and minimum or optimal device requirements.

At block 410, an interactive version of an application is presented. In one embodiment, interactive versions capable of running in the web interface or the application interface may be presented. The interactive versions may allow users to try the applications or service with partial or complete functionality. For example, a news application which uses RSS feeds may be presented and the user will be able to navigate around as if he/she was using the application via a wireless device (e.g., cellular telephone).

At block 412, an application selection is received. As described herein, the application selection may be received from a web client (e.g., web client 150). For example, a user may select an application that he/she is interested in purchasing and select the application for immediate purchase. In one embodiment, a user may add a selected application to a shopping cart for later purchase.

At block 414, a plurality of billing options are presented. In one embodiment, the billing options may be presented as part of checkout process. A wide variety of billing options may be presented, as described herein, including, but not limited to, use based trial, one day trial, one month, several month subscription, or recurring subscription.

At block 416, a request is received to purchase the selected application. As described herein, the request to purchase a selected application may be received from a web client (e.g., web client 150). The request may include a selected application and the selected billing option as described herein. In one embodiment, as described herein, the request to purchase the application may have been initiated from a shopping cart or checkout interface or page.

At block 418, an expiration is set. In one embodiment, the expiration is set immediately in the wireless device account. The expiration may be set via a software based unit (e.g., billing module 304). The expiration corresponds to billing options selected and be set accordingly in the wireless device account. For example, if a several month subscription was selected the expiration date will be several months from the current date. In another example, if the user selects a recurring subscription an appropriate expiration date may be set to 00/00/0000 or other symbol. It is appreciated that the date could also include more information such as time of day or application use count.

At block 420, application customization options are presented. In one embodiment, the customization options may be presented and stored via a software based unit (e.g., customization module 308). Cutomization options, as described herein, allow a user to select one or more application objects (e.g., RSS feeds, location information, information components or modules such as a weather module, user information, etc.) and visual objects (e.g., icons, skins, layouts, and the like) to be added to an application.

At block 422, the wireless device account is updated. The wireless account (e.g., one of wireless accounts 135), as described herein, is updated to include the newly purchased application and expiration. In one embodiment, the wireless device account may also be updated with an customization options that have been selected.

FIG. 5 shows an exemplary computer controlled flow diagram of a server implemented method for account management in accordance with one embodiment of the present invention. The blocks of flowchart 500 may be carried out by a computing system (e.g., computing system environment 200) acting as a web server (e.g., web server 140) via software based units (e.g., system 300). It is appreciated that the blocks of flowchart 500 may be carried out by a computing system that also hosts or stores various wireless devices accounts as described herein.

At block 502, a web interface is presented for creating an account. In one embodiment, a web interface may be presented via a software based unit (e.g., account manager 302). A user can enter authentication information such as username and password information as well as billing information (e.g., credit card, billing address, and the like). The web interface may further facilitate convenient access by allowing a user to stay logged in (e.g., not require reentry of authentication information) such as with the use of cookies. It is noted that the secure updating of the wireless account via the web interface allows the phone to access the wireless account without requiring authentication (e.g., username and password) via the wireless device.

At block 504, a first message to create an account is received. The first message may include a phone number, electronic serial number, or the like which may be used to determine carrier or service provider as well as the phone model. In one embodiment, the message may be issued from the web interface via a web browser (e.g., executing on web client 150).

At block 506, a second message with an identifier is sent to a wireless device, as described herein. In one embodiment, the message may be an SMS (Short Message Service) message. The identifier or identification information may include an identification code or key (e.g., hash, password, or the like) which may be a unique identifier. The identification information may also include a link (e.g., URL) that contains unique identification information.

At block 508, a third message is received including the identifier from the second message previously sent. The identifier may be verified or confirmed by having the information (e.g. key) entered into the web interface (e.g., via web client 150). The identifier may also be verified by the following of a link (e.g., URL) via the wireless device. This verification ensures the system is dealing with the owner of the wireless device.

At block 510, a web account is created. In one embodiment, the web account (e.g., one of web accounts 145) may be created by the execution of a software based unit (e.g., account setup module 306). The web account may contain login information, billing info, phone number, and other wireless device information. In one embodiment, the authentication information is stored (e.g., via a cookie) on a computing device (e.g., web client 150) for return access.

At block 512, a link is established between the web account a wireless applications account. In one embodiment, the link between the web account (e.g., one of web accounts 145) and the wireless applications account (e.g., one of wireless accounts 135) may be established by a software based unit (e.g., account setup module 306). The link may allow users to see all the applications that he/she currently has access to via his/her wireless device (e.g., cellular telephone) and to add applications to his/her wireless account as described herein.

At block 514, customization options associated with said wireless applications account are presented. In one embodiment, the customization options may be presented and stored via a software based unit (e.g., customization module 308). As described herein, the customization options may allow the customization of wireless applications and the web interfaces. For example, any default applications or applications with free trials may be may require a skin (or set of images) or RSS feed to be selected.

Accordingly, applications can be purchased and customized for a wireless account with the ease of a web interface. Users are able to quickly and easily purchase applications via a familiar web interface without having to use the limited interface of a wireless device. Software vendor and developers are relieved from having to tailor their applications to the various billing systems of diverse carriers or service providers. Moreover, businesses are able to charge customers in any format (e.g., one time billing, recurring billing, or the like) and thereby not limited by the abilities of a carriers' billing systems.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing wireless account information, comprising:
   presenting a list of a plurality of applications via a web interface on a computing device associated with a web account, said plurality of applications configured to run on a wireless handheld device;
   receiving, from said computing device, a selection of an application from said plurality of applications;
   presenting, via said web interface, an interactive preview of said application;
   presenting, via said web interface, a plurality of billing options for said application from said plurality of applications;
   receiving, via the web interface, a selected billing option from said plurality of billing options;
   setting an expiration date for said application from said plurality of applications based on said selected billing option; and
   updating, after presenting the interactive preview, a wireless carrier account via a link between said web account and said wireless carrier account according to said selection of said application such that said application is available when said wireless carrier account is accessed via said wireless handheld device, fees associated with said application from said plurality of applications configured to be automatically billed via said wireless carrier account based on said selected billing option, said web account being independent of said wireless carrier account.

2. The method of claim 1,
   wherein said web interface is independent of a wireless carrier website.

3. The method of claim 1, further comprising:
   establishing a secure connection between the computing device and a server storing the plurality of applications.

4. The method of claim 1, further comprising:
   sending a signal to said wireless handheld device, said signal configured to cause said wireless handheld device to display a message indicating access to said application has expired.

5. The method of claim 1, further comprising:
   presenting application customization options.

6. The method of claim 1,
   wherein said wireless carrier account is a wireless service account.

7. A system for accessing information for wireless applications, comprising:
   a non-transitory processor-readable medium;
   a customization component implemented in the non-transitory processor-readable medium, the customization component configured to present a list of a plurality of applications via a web interface of a computing device associated with a web account, said plurality of applications configured to run on a wireless handheld device;
   an account management component for managing the web account and for managing authentication information associated with the web account;
   a billing component for managing billing and purchasing of an application from the plurality of applications, said billing component configured to present, via said web interface, a plurality of billing options for said application, said billing component configured to set an expiration date for said application from said plurality of applications based on a selected billing option from said plurality of billing options;
   an account setup component for defining the web account and associating the web account with a wireless carrier account associated with the wireless handheld device such that said application is available when said wireless carrier account is accessed via said wireless handheld device, fees associated with said application from said plurality of applications configured to be automatically billed via the wireless carrier account based on said selected billing option, said web account being independent of said wireless carrier account; and
   an interactive preview component configured to present an interactive preview of the application via the web interface of the computing device associated with the web account prior to purchasing the wireless application for execution on the wireless handheld device.

8. The system of claim 7,
   wherein the web account is a first web account, the system further comprising:
   a sending component configured to send the application from the plurality of applications to a second web account based on purchasing the application using the first web account.

9. The system of claim 8,
   wherein said sending component is configured to send a notification message associated with the application from the plurality of applications to the second web account.

10. The system of claim 7, further comprising:
    a customization component that allows selection of one or more application objects.

11. The system of claim 10,
    wherein said one or more application objects are RSS feeds.

12. The system of claim 10,
    wherein said one or more application objects are icons.

13. The system of claim 7 further comprising:
    a customization component for customizing information associated with said wireless carrier account.

* * * * *